US009700822B2

(12) United States Patent
Horng et al.

(10) Patent No.: US 9,700,822 B2
(45) Date of Patent: Jul. 11, 2017

(54) AIR EXCHANGE DEVICE

(71) Applicant: Sunonwealth Electric Machine Industry Co., Ltd., Kaohsiung (TW)

(72) Inventors: Alex Horng, Kaohsiung (TW); Ming-Tsung Li, Kaohsiung (TW); Tsung-Chi Wang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 20 days.

(21) Appl. No.: 14/794,903

(22) Filed: Jul. 9, 2015

(65) Prior Publication Data
US 2016/0051922 A1    Feb. 25, 2016

(30) Foreign Application Priority Data

Aug. 20, 2014    (TW) .............................. 103128681 A

(51) Int. Cl.
| B01D 46/12 | (2006.01) |
| B03C 3/017 | (2006.01) |
| G06F 1/16 | (2006.01) |
| B01D 46/00 | (2006.01) |
| B01D 46/42 | (2006.01) |

(52) U.S. Cl.
CPC ..... *B01D 46/0005* (2013.01); *B01D 46/0023* (2013.01); *B01D 46/42* (2013.01); *B01D 2273/30* (2013.01)

(58) Field of Classification Search
CPC .... B01D 46/12; B01D 50/10; B01D 53/0407; B01D 46/0013; B03C 3/017; G06F 1/16
USPC ... 55/385.1, 470, 471, 472, 473, 385.2, 418; 96/139; 131/233, 235.1, 242; 454/184, 454/192, 187; 206/454, 710
See application file for complete search history.

(56) References Cited

U.S. PATENT DOCUMENTS

| 7,300,485 | B1 * | 11/2007 | Moore ................... B03C 3/017 131/233 |
| 7,335,244 | B2 * | 2/2008 | Kisakibaru ........ B01D 53/0407 206/454 |
| 7,419,533 | B2 * | 9/2008 | Son .................... B01D 46/0013 55/342 |
| 2004/0192186 | A1 * | 9/2004 | Bourgeois ............. B01D 46/12 454/187 |

* cited by examiner

*Primary Examiner* — Jacob T Minskey
*Assistant Examiner* — Minh-Chau Pham
(74) *Attorney, Agent, or Firm* — Alan D. Kamrath; Kamrath IP Lawfirm, P.A.

(57) ABSTRACT

An air exchange device includes: an air-guiding tube having a first end and a second end opposite to each other, with the first end having a first inlet and a first outlet, and with the second end having a second inlet and a second outlet; a partition arranged inside the air-guiding tube to divide the inside of the air-guiding tube into a first air-guiding space communicating with the first and second inlets and a second air-guiding space communicating with the first and second outlets; a first filter arranged in a position adjacent to the first inlet; a second filter arranged in a position adjacent to the second inlet; and at least one fan adapted to draw and expel air and combined with the air-guiding tube. Bores of meshes of the first filter are larger than bores of meshes of the second filter.

20 Claims, 6 Drawing Sheets

AIR EXCHANGE DEVICE

BACKGROUND OF THE INVENTION

1. Field of the Invention

The present invention generally relates to an air exchange device and, more particularly, to an air exchange device for air exchange between an internal space and an external space to provide an air exchange effect.

2. Description of the Related Art

Referring to FIG. 1, a conventional air exchange device 9 is shown. This air exchange device 9 is settled in a building's wall or the housing of an electrical product. Taking a wall 91 of a building as an example, an internal space is inside the wall 91, and an external space is outside the wall 91. The wall 91 includes an inlet 911 and an outlet 912, and each of the inlet 911 and the outlet 912 has a fan 92. Therefore, when the fans 92 operates, air in the external space enters the internal space via the inlet 911, and then is expelled from the internal space to the external space via the outlet 912, to provide a cyclical air-exchange function.

However, in a practical use of settlement of this air exchange device 9, at least two through holes are formed in the wall 91 (serving as the inlet 911 and outlet 912), to provide a preferable cyclical air-exchange function. It can lead to limited use, inconvenience in settlement, and high settling cost by forming the at least two through holes in the wall 91 and arranging fans to each through hole, and thus further leads to a bad result in practical use.

Moreover, since the air in the external space often includes various polluted objects such as large impurities or floating particles, in order to prevent the operating fan 92 from guiding unwanted objects into the internal space from the external space, the fan 92 usually has a filter 921 to filter the air passing through the fan 92. However, if the bores of the meshes of the filter 921 are too large, the filtering performance of the filter 921 is bad. On the contrary, if the bores of the meshes of the filter 921 are too small, the airflow is sluggish and thus leads to a bad performance in air driving performance of the fan 92. Furthermore, after a long-term or continuous use of the conventional air exchange device 9, the filter 921 may be attached with unwanted objects and be blocked thereby, and thus, the fan 92 cannot smoothly guide air in the external space into the internal space. Accordingly, users have to release the fan 92 from the inlet 911, to clean or replace the filter 921, and this further lowers the convenience in use of this conventional air exchange device 9.

SUMMARY OF THE INVENTION

What is needed is an air exchange device able to provide a desirable air exchange function in use without forming two or more than two through holes in a divider.

Another need is an air exchange device filtering the airflow passing through an air-guiding tube by a first filter and a second filter, to improve the air-filtering efficiency.

A further need is an air exchange device with a first filter and a second filter that can be easily removed for cleaning or replacement, to improve the usage convenience of the air exchange device.

In one implementation, an air exchange device includes: an air-guiding tube having a first end and a second end opposite to each other, with the first end having a first inlet and a first outlet, and with the second end having a second inlet and a second outlet; a partition arranged inside the air-guiding tube to divide the inside of the air-guiding tube into a first air-guiding space and a second air-guiding space, with the first air-guiding space communicating with the first inlet and the second inlet, and with the second air-guiding space communicating with the first outlet and the second outlet; a first filter arranged in a position adjacent to the first inlet of the air-guiding tube; a second filter arranged in a position adjacent to the second inlet of the air-guiding tube; and at least one fan adapted to draw and expel air and combined with the air-guiding tube. Bores of meshes of the first filter are larger than bores of meshes of the second filter.

In this implementation, one or more of the following features may be included: an external space outside the first end of the air-guiding tube, with the first filter communicating with the first inlet, so that the first filter is formed between the first air-guiding space and the external space for filtering an airflow passing through the first inlet; a cap having a communicating opening, an outer auxiliary inlet and an outer auxiliary outlet, with the cap connecting with the first end of the air-guiding tube and facing the first inlet and the first outlet via the communicating opening, and with the first filter arranged at the outer auxiliary inlet; the cap having a board separating the inside of the cap into a first air-dividing space and a second air-dividing space, with the communicating opening forming a first opening and a second opening corresponding to the board, with the first opening in alignment with the first inlet, with the second opening in alignment with the first outlet, with the outer auxiliary inlet and the first opening communicating with the first air-dividing space, and with the outer auxiliary outlet and the second opening communicating with the second air-dividing space; the board being adjacent to the first end, connecting with the partition, and extending into the cap via the communicating opening; an internal space outside the second end of the air-guiding tube, with the second filter communicating with the second inlet, so that the second filter is formed between the first air-guiding space and the internal space for filtering the airflow passing through the second inlet; a shield formed between the second filter and the internal space, with bores of meshes of the shield larger than bores of the meshes of the second filter; a base having a communicating opening, an inner auxiliary inlet and an inner auxiliary outlet, with the base connecting with the second end of the air-guiding tube and facing the second inlet and the second outlet via the communicating opening, and with the second filter arranged at the inner auxiliary inlet; a shield formed between the second filter and the internal space, with the shield coupling with a side of the inner auxiliary inlet of the base, with said side of the inner auxiliary inlet facing the internal space, and with bores of meshes of the shield larger than bores of meshes of the second filter; the base having a board in alignment with the communicating opening and separating the inside of the base into a first air-dividing space and a second air-dividing space, with the communicating opening forming a first opening and a second opening corresponding to the board, with the first opening in alignment with the second inlet, with the second opening in alignment with the second outlet, with the inner auxiliary inlet and the first opening communicating with the first air-dividing space, and with the inner auxiliary outlet and the second opening communicating with the second air-dividing space; the base having a dust container inside, with the dust container detachably coupled inside the base via the inner auxiliary inlet and having a first compartment, with a part of the communicating opening in alignment with the dust container forming a first opening, with another part of the communicating opening in misalignment with the dust container forming a second opening, with the first opening aligning with the second inlet, with the second opening aligning with the second outlet, and with the inner auxiliary inlet and the first opening communicating with the first compartment; the base having an exhaust hood inside, with a part of the communicating opening in alignment with the exhaust hood forming the second opening, with the exhaust hood having a second compartment, and with the inner auxiliary outlet and the second opening communicating with the second compartment; the air-guiding tube having a first direction and a second direction perpendicular to each other, with the first end and the second end being formed at two ends of the first direction of the air-guiding tube, with the partition extending in the first direction from the first end until the second end, to divide the inside of the air-guiding tube in the second direction to form the first air-guiding space and the second air-guiding space; the partition having a first partitioning part and a second partitioning part, with the first partitioning part adjacent to the first end of the air-guiding tube, with the second partitioning part adjacent to the second end of the air-guiding tube, with an inclined connecting section linking and between the first partitioning part and the second partitioning part, and with the inclined connecting section extending in the first direction and inclining from the first air-guiding space to the second air-guiding space, so that the bore of the first inlet is smaller than the bore of the first outlet, and so that the bore of the second inlet is larger than the bore of the second outlet; the at least one fan being arranged inside at least one of the first air-guiding space and the second air-guiding space; the at least one fan being a single fan, with the fan arranged in the first air-guiding space, and with the fan being arranged on a surface of the second partitioning part, and with said surface facing the first air-guiding space; the at least one fan a single fan, with the fan being arranged in the second air-guiding space, with the fan arranged on a surface of the first partitioning part, and with said surface facing the second air-guiding space; the at least one fan having two fans, with the two fans arranged in the first air-guiding space and the second air-guiding space respectively, with one of the fans being mounted on a surface of the second partitioning part facing the first air-guiding space, and with the other one of the fans being mounted on a surface of the first partitioning part facing the second air-guiding space; the air-guiding tube connecting with a cover adapted to cover the first end of the air-guiding tube; and the second filter made of filtering material qualified as a standard for particulate matter 2.5, high efficiency particulate air filter, or ultra low penetration air filter.

By provision of the air exchange device, a divider can be selected to have a single through hole, to coordinate with the air exchange device to provide a desirable air exchange function between an external space and an internal space. Since it is unnecessary to form two or more than two through holes in the divider, only one air-guiding tube has to be arranged in the single through hole for providing the desirable air exchange function. Therefore, the embodiments of the air exchange device of the present invention have advantages such as a wide range in application and easy installation, which have the efficiency in improvement of practicality of the air exchange device. Moreover, the air exchange device of the present invention has the first and second filters to respectively filter the airflow passing through the air-guiding tube, so that the air-filtering efficiency is improved. Thus, a better air quality of the airflow drawn from the external space is assured. Additionally, the first and second filters can be easily removed to be cleaned or replaced without disengagement of the at least one fan, and, thus, usage convenience of the air exchange device is improved.

BRIEF DESCRIPTION OF THE DRAWINGS

The present invention will become more fully understood from the detailed description given hereinafter and the accompanying drawings which are given by way of illustration only, and thus are not limitative of the present invention, including.

Figure 1:
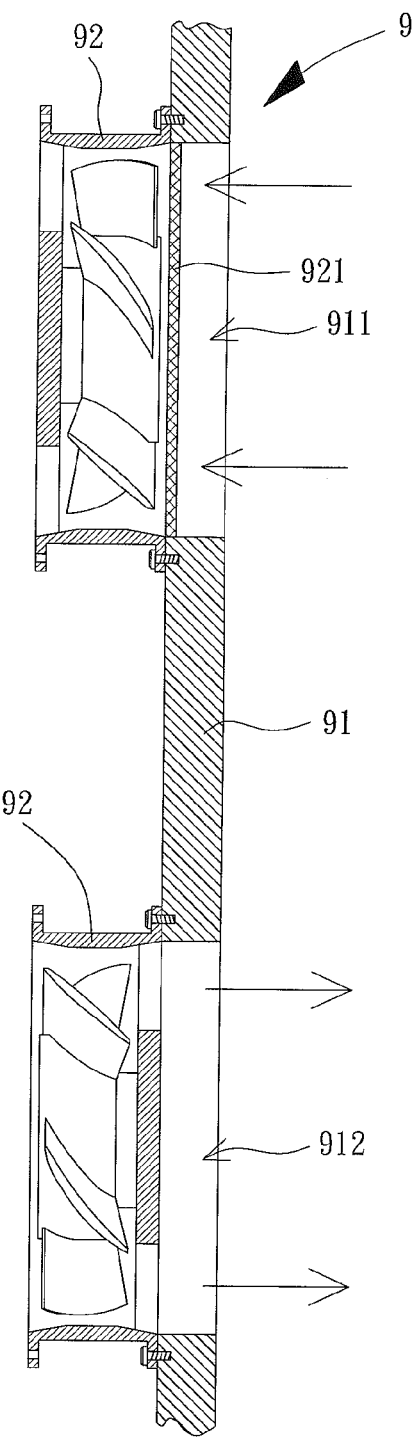
FIG. 1 is a detailed cross-sectional view of a conventional air exchange device.

In the various figures of the drawings, the same numerals designate the same or similar parts. Furthermore, when the term "first," "second," "inner," "outer," "external," "internal," and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

In the following contents, a "divider" is any structure capable of separating an external space and an internal space. For example, when a housing of an electronic product serves as the divider, the external space is the space outside the housing, and the internal space is the space inside the housing. As another example, when a wall of a building serves as the divider, the external space is the space outside the building, and the internal space is the space inside the building.

Figure 2:
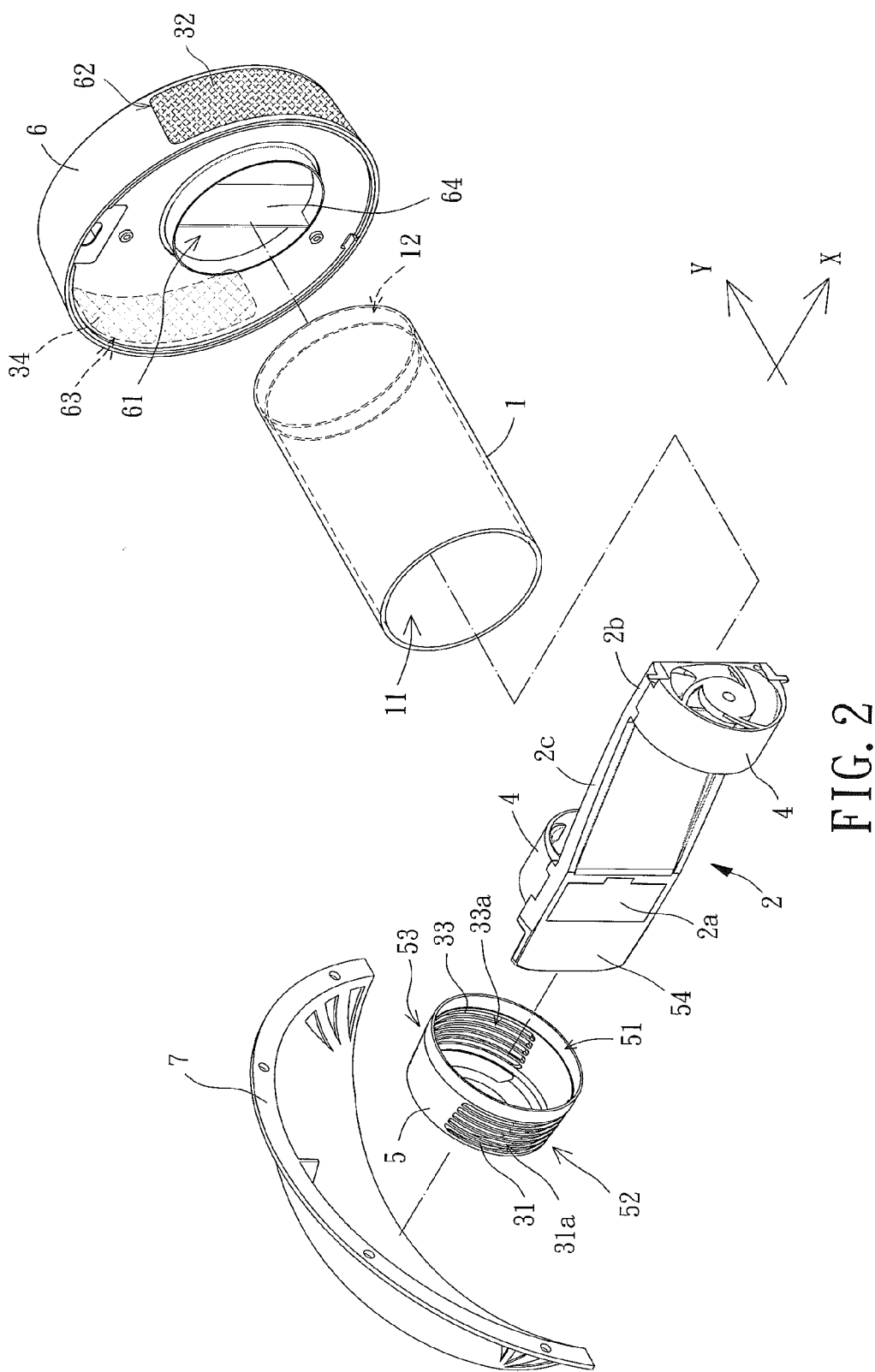
FIG. 2 is an exploded and perspective view of an air exchange device according to a first embodiment of the present invention.
Figure 3:
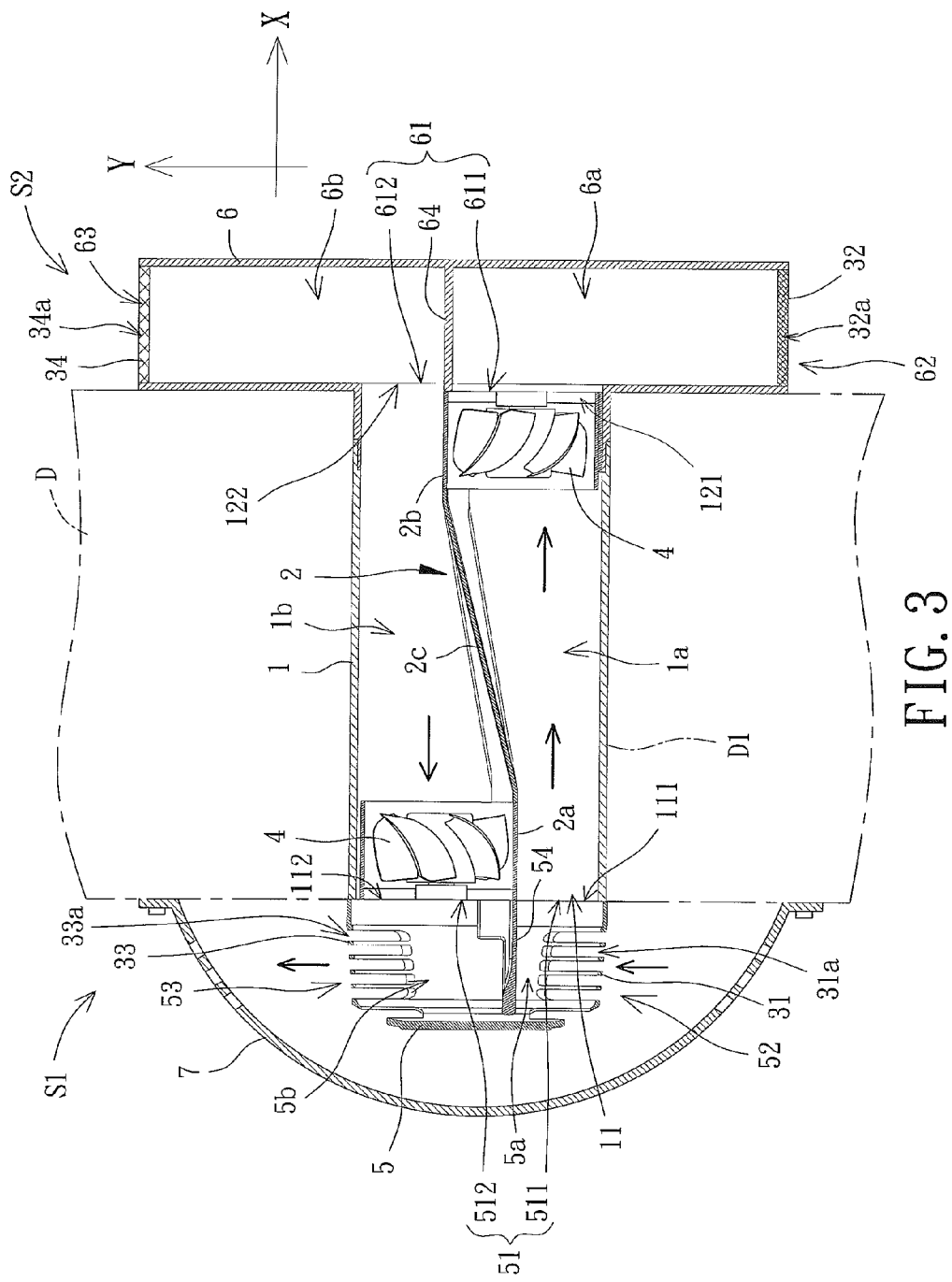
FIG. 3 is a cross-sectional view of the air exchange device according to the first embodiment of the present invention.

Referring to FIGS. 2 and 3, an air exchange device of a first embodiment of this invention is mounted on a divider "D." An external space "S1" is at one side of the divider "D," and an internal space "S2" is at an opposite other side of the divider "D." This air exchange device at least includes an air-guiding tube 1, a partition 2, a first filter 31, a second filter 32, and at least one fan 4. The air-guiding tube 1 is arranged in a through hole "D1" of the divider "D." The partition 2 and the at least one fan 4 are settled inside the air-guiding tube 1. The first filter 31 and the second filter 32 are arranged adjacent to two ends of the air-guiding tube 1.

The air-guiding tube 1 can be a tube in any shape. In this embodiment, the air-guiding tube 1 is a tube with a round sectional shape. However, the air-guiding tube 1 can also be a tube with a rectangular sectional shape or other sectional shape, and this invention is not thus limited. The air-guiding tube 1 has a first end 11 and a second end 12 opposite to the first end 11. The first end 11 has a first inlet 111 and a first outlet 112, and the second end 12 has a second inlet 121 and a second outlet 122, to guide air to enter or exit the air-guiding tube 1. The first filter 31 is positioned adjacent to the first inlet 111 of the first end 11 of the air-guiding tube 1, and the second filter 32 is positioned adjacent to the second inlet 121 of the second end 12 of the air-guiding tube 1.

The partition 2 is settled inside the air-guiding tube 1 for dividing the inside of the air-guiding tube 1 into two separate spaces: a first air-guiding space 1a and a second air-guiding space 1b. Furthermore, the combination between the partition 2 and the air-guiding tube 1 can be an integral formation or a detachable connection. The first air-guiding space 1a communicates with the first inlet 111 and the second inlet 121, and the second air-guiding space 1b communicates with the first outlet 112 and the second outlet 122. The partition 2 is any structure capable of separating the inside of the air-guiding tube 1 into the first air-guiding space 1a and the second air-guiding space 1b. In this embodiment, the partition 2 includes a first partitioning part 2a and a second partitioning part 2b, and an inclined connecting section 2c links the first partitioning part 2a and the second partitioning part 2b. With the design of the inclined connecting section 2c, the airflow flowing in the first partitioning part 2a and the second partitioning part 2b can obtain a better air-guiding performance.

The external space "S1" is outside the first end 11 of the air-guiding tube 1, with the first filter 31 communicating with the first inlet 111, so that the first filter 31 is formed between the first air-guiding space 1a and the external space "S1" for filtering the airflow passing through the first inlet 111. Correspondingly, the internal space "S2" is outside the second end 12 of the air-guiding tube 1, with the second filter 32 communicating with the second inlet 121, so that the second filter 32 is formed between the first air-guiding space 1a and the internal space "S2" for filtering the airflow passing through the second inlet 121. Specifically, the first filter 31 has a plurality of meshes 31a, the second filter 32 also has a plurality of meshes 32a, and the bores of the meshes 31a of the first filter 31 are larger than the bores of the meshes 32a of the second filter 32.

The at least one fan 4 is combined with and inside the air-guiding tube 1 and is adapted for air drawing and expelling. The combining position of the fan 4 is not limited as long as the at least one fan 4 is able to draw air into or expel air out of the air-guiding tube 1. For example, the at least one fan 4 can be arranged inside at least one of the first air-guiding space 1a and the second air-guiding space 1b. Alternatively, the at least one fan 4 can be arranged in at least one of the first inlet 111, first outlet 112, second inlet 121, and second outlet 122. Therefore, the total volume of the air exchange device is efficiently reduced, and extra space for the at least one fan 4 is avoided. Specifically, the at least one fan 4 can be a single fan 4 or plural fans 4. If the at least one fan 4 is a single fan 4, the fan 4 can be arranged in the first air-guiding space 1a or the second air-guiding space 1b. Alternatively, in this embodiment, the at least one fan 4 includes two fans 4, and these two fans 4 are arranged in the first air-guiding space 1a and the second air-guiding space 1b respectively, to improve the air-driving efficiency. The at least one fan 4 can be any kind of structural design capable of being driven by a motor for guiding air, such as an axial fan, a centrifugal fan, a blower or a horizontal convection fan.

In the first embodiment of the air exchange device, there can be a cap 5 having a communicating opening 51, an outer auxiliary inlet 52 and an outer auxiliary outlet 53. Via the communicating opening 51, the cap 5 connects with the first end 11 of the air-guiding tube 1 and faces the first inlet 111 and the first outlet 112. The first filter 31 may be arranged at the outer auxiliary inlet 52. Specifically, the cap 5 has a board 54 separating the inside of the cap 5 into a first air-dividing space 5a and a second air-dividing space 5b. Corresponding to the board 54, the communicating opening 51 includes a first opening 511 and a second opening 512, with the first opening 511 in alignment with the first inlet 111 and with the second opening 512 in alignment with the first outlet 112. The outer auxiliary inlet 52 and the first opening 511 communicate with the first air-dividing space 5a, and the outer auxiliary outlet 53 and the second opening 512 communicate with the second air-dividing space 5b. The board 54 may be adjacent to the first end 11, connect with the partition 2, and extend into the cap 5 via the communicating opening 51 to divide the inside of the cap 5 into the first air-dividing space 5a and the second air-dividing space 5b. However, the board 54 can also be integrally formed on the cap 5.

Since the airflow from the external space "S1" must pass through the outer auxiliary inlet 52, the first opening 511 and the first inlet 111 in order to enter the first air-guiding space 1a, the first filter 31 can be formed between the first air-guiding space 1a and the external space "S1" by arranging the first filter 31 at the outer auxiliary inlet 52, to achieve the effect of filtering the airflow passing through the first inlet 111.

Additionally, in the first embodiment of the air exchange device, there can further be a base 6 having a communicating opening 61, an inner auxiliary inlet 62 and an inner auxiliary outlet 63. Via the communicating opening 61, the base 6 connects with the second end 12 of the air-guiding tube 1 and faces the second inlet 121 and the second outlet 122. The second filter 32 may be arranged at the inner auxiliary inlet 62. Specifically, the base 6 has a board 64 in alignment with the communicating opening 61 and separating the inside of the base 6 into a first air-dividing space 6a and a second air-dividing space 6b. Corresponding to the board 64, the communicating opening 61 includes a first opening 611 and a second opening 612, with the first opening 611 in alignment with the second inlet 121 and with the second opening 612 in alignment with the second outlet 122. The inner auxiliary inlet 62 and the first opening 611 communicate with the first air-dividing space 6a, and the inner auxiliary outlet 63 and the second opening 612 communicate with the second air-dividing space 6b. The board 64 may be integrally formed on the base 6 to divide the inside of the base 6 into the first air-dividing space 6a and the second air-dividing space 6b. However, the board 64 can also connect with a side of the partition 2 adjacent to the second end 12 and extend into the base 6 via the communicating opening 61.

Since the airflow from the external space "S1" must pass through the second inlet 121, the first opening 611 and the inner auxiliary inlet 62 in order to enter the internal space "S2," the second filter 32 can be formed between the first air-guiding space 1a and the internal space "S2" by arranging the second filter 32 at the inner auxiliary inlet 62, to achieve the effect of filtering the airflow passing through the second inlet 121.

Referring to FIG. 3, with the above mentioned structure, in use of the first embodiment of the air exchange device, the divider "D" can be selected to have only one hole, that is, the through hole "D1," and the air-guiding tube 1 is fixed in the through hole "D1" of the divider "D." Therefore, when the at least one fan 4 operates, the airflow from the external space "S1" can enter the first air-guiding space 1a of the air-guiding tube 1 via the outer auxiliary inlet 52 and the first inlet 111 sequentially, and then the airflow in the first air-guiding space 1a can be guided to the internal space "S2" through the second inlet 121 and the inner auxiliary inlet 62. On the other hand, the airflow in the internal space "S2" can also further enter the second air-guiding space 1b of the air-guiding tube 1 via the inner auxiliary outlet 63 and the second outlet 122 sequentially, and then be guided to the external space "S1" through the first outlet 112 and the outer auxiliary outlet 53. Accordingly, a desirable air exchange function is provided.

Particularly, the airflow can be filtered by the first filter 31 for the first time when the airflow from the external space "S1" passes through the outer auxiliary inlet 52, and the airflow can be filtered by the second filter 32 for the second time when the airflow passes through the inner auxiliary inlet 62. Accordingly, with the design that bores of meshes 31a of the first filter 31 are larger than bores of meshes 32a of the second filter 32, the first filter 31 can initially filter out large impurities, such as leaves, petals, hair, wastepaper, sand, and bugs, in the air of the external space "S1." Since the bores of the meshes 31a of the first filter 31 are larger, the first filter 31 can be a grid made of plastic or metal material, and the holes of the grid can serve as the meshes 31a. The grid can be integrally formed in the cap 5. Alternatively, the grid can be an independent member for coupling with the outer auxiliary inlet 52 of the cap 5. However, the first filter 31 can also be made by a cotton filter sheet.

On the other hand, since the bores of the meshes 32a of the second filter 32 are smaller, the second filter 32 can further filter out the particulate matter, such as pollen, dust mites, smoke, and haze, in the air of the external space "S1." Practically, the second filter 32 can be made of a cotton filter sheet. However, when both of the first and second filters 31, 32 are made of cotton filter sheets, the holes in the cotton filter sheet of the second filter 32 should be smaller than the holes in the cotton filter sheet of the first filter 31, so that the bores of the meshes 32a of the second filter 32 are smaller. Specifically, the second filter 32 is preferably made of filtering material qualified as or close to the CCME standard for particulate matter 2.5 (PM2.5), so that the second filter 32 can filter out particulate matter with diameters about or larger than 2.5 μm and thus ensure that the air guided into the internal space "S2" qualifies as the CCME standard for PM2.5. Furthermore, the second filter 32 can also be made by high efficiency particulate air filter (HEPA) or ultra low penetration air filter (ULPA). In other words, the material of the second filter 32 can be selected according to the practical requirement in air quality.

Furthermore, the outer auxiliary outlet 53 of the cap 5 can have a third filter 33 communicating with the first outlet 112, to filter the air flowing through the first outlet 112. Similar to the first filter 31, the third filter 33 can be made of a grid or a cotton filter sheet. Accordingly, the third filter 33 can isolate the second air-guiding space 1b of the air-guiding tube 1 from the external space "S1," to prevent unwanted objects in the external space "S1," such as flies, bugs or small reptiles, from entering the air-guiding tube 1 via the outer auxiliary outlet 53. Similarly, the inner auxiliary outlet 63 of the base 6 can have a fourth filter 34 communicating with the second outlet 122, to filter the air flowing through the second outlet 122. The fourth filter 34 can also be made of a grid or a cotton filter sheet. Accordingly, the fourth filter 34 can isolate the internal space "S2" from the second air-guiding space 1b of the air-guiding tube 1, to prevent unwanted objects in the internal space "S2," such as flies, bugs or small reptiles, from entering the air-guiding tube 1 via the inner auxiliary outlet 63. Particularly, the third filter 33 and the fourth filter 34 have pluralities of meshes 33a, 34a respectively, the bores of the meshes 33a of the third filter 33 can be larger than, equal to, or smaller than the bores of the meshes 31a of the first filter 31, and the bores of the meshes 34a of the fourth filter 34 can also be larger than, equal to, or smaller than the bores of the meshes 31a of the first filter 31. However, each of the bores of the meshes 31a, 33a, 34a of the first filter 31, the third filter 33 and the fourth filter 34 is larger than the bores of the meshes 32a of the second filter 32. Since the positions, ways of connection and materials of the third and fourth filters 33, 34 can be implemented according to what is disclosed in the first embodiment, they are not further illustrated for the third and fourth filters 33, 34.

Referring to FIGS. 2 and 3, since the first end 11 of the air-guiding tube 1 and the cap 5 are in the external space "S1," when the divider "D" is the wall of a building, and when the external space "S1" is the outside of the building, rain may fall on the first end 11 or the cap 5 and even go through the outer auxiliary inlet 52 or the outer auxiliary outlet 53 and thus enter the cap 5. Therefore, the air-guiding tube 1 may be connected with a cover 7 for covering the first end 11 of the air-guiding tube 1, so that the cover 7 provides a shield effect to the first end 11 and the cap 5 and thus prevents rain from contacting the air-guiding tube 1, the cap 5 or the first filter 31 directly.

Please note that the cap 5 can be connected to the first end 11 by an undetectable way such as welding or adhesion, so that the first filter 31 is fixed to the air-guiding tube 1 permanently. However, the cap 5 can also be connected to the first end 11 detachably. For example, the cap 5 can be connected with the first end 11 by thread or engagement. Therefore, the user only needs to remove the cap 5 from the air-guiding tube 1 and directly clean or replace the first filter 31 if any unwanted object attaches to the first filter 31 after the air exchange device is used. Similarly, when there is a blocking situation in the second filter 32, the second filter 32 can be removed from the air-guiding tube 1 by the user, to be cleaned or replaced. The detailed connection between the first filter 31 or the second filter 32 and the air-guiding tube 1 is not further illustrated since the ways to connect the first filter 31 or the second filter 32 to the air-guiding tube 1 are conventional.

Figure 4:
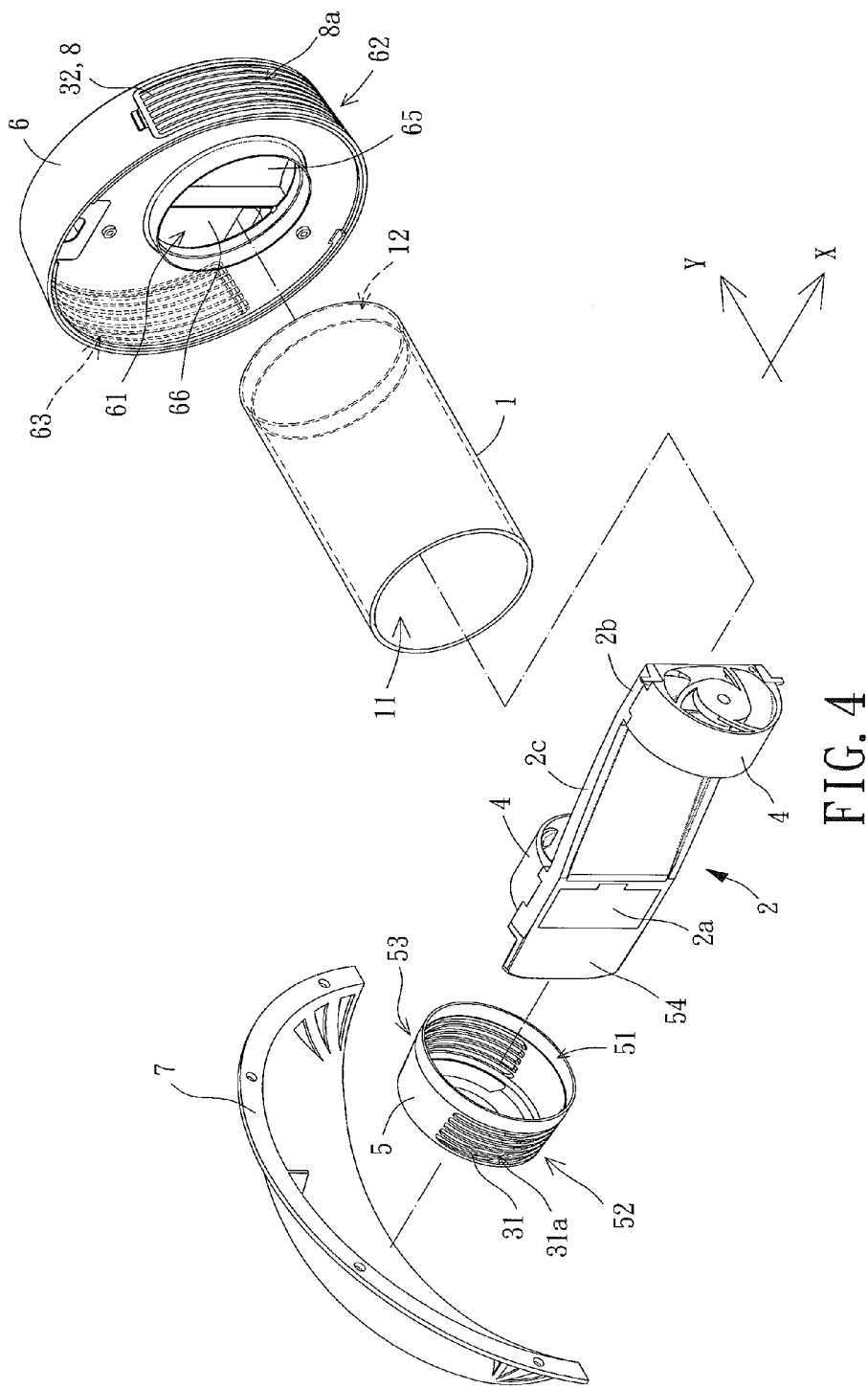
FIG. 4 is an exploded and perspective view of an air exchange device according to a second embodiment of the present invention.
Figure 5:
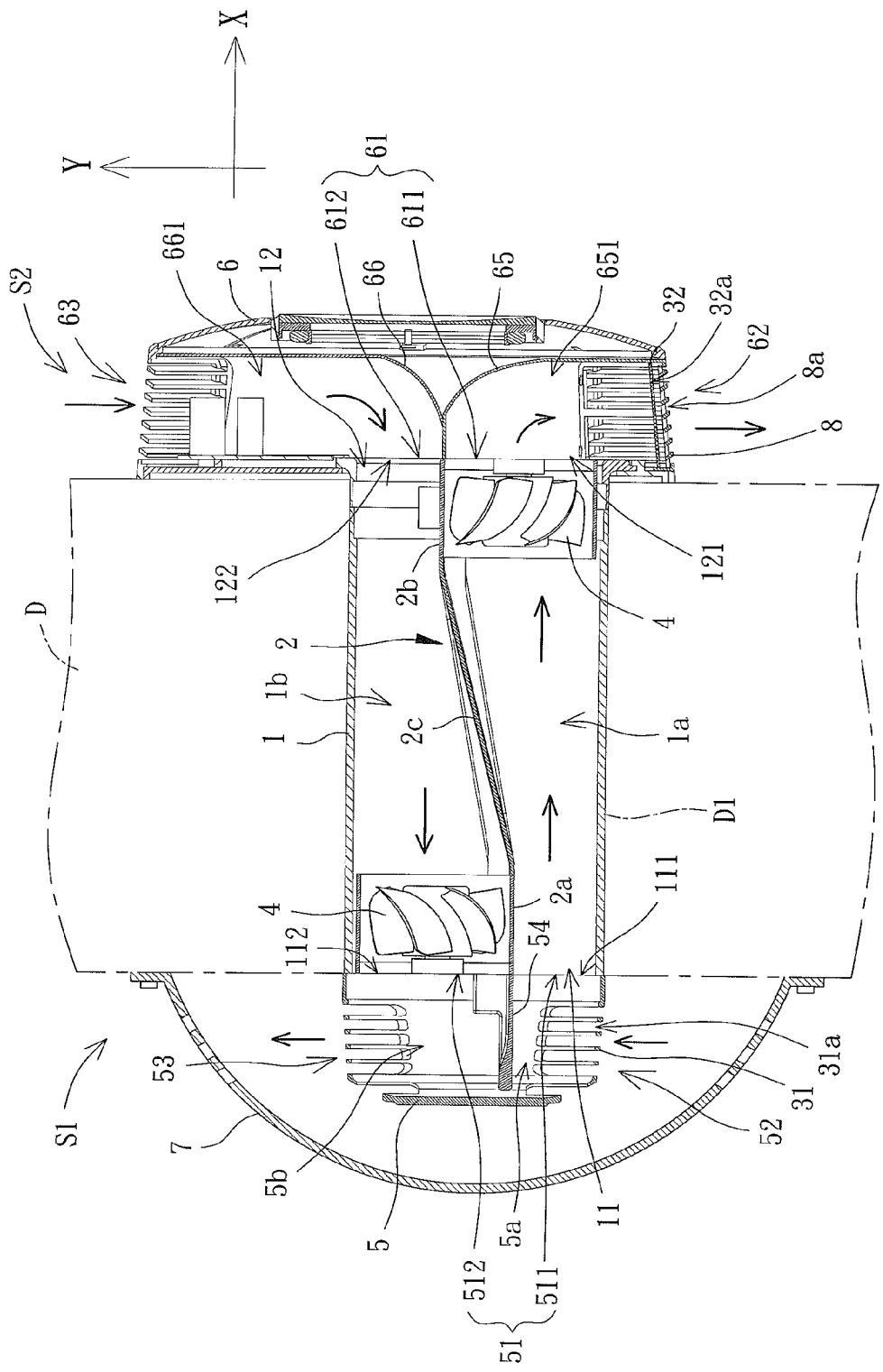
FIG. 5 is a cross-sectional view of the air exchange device according to the second embodiment of the present invention.

Referring to FIGS. 4 and 5, an air exchange device of a second embodiment of this invention is shown. In this embodiment, there is also a base 6 having a communicating opening 61, an inner auxiliary inlet 62 and an inner auxiliary outlet 63. Via the communicating opening 61, the base 6 connects with the second end 12 of the air-guiding tube 1 and faces the second inlet 121 and the second outlet 122. The difference between this embodiment and the previous one lies in that the base 6 has a dust container 65 and an exhaust hood 66. The dust container 65 is detachably coupled inside the base 6 via the inner auxiliary inlet 62 and has a first compartment 651. The exhaust hood 66 has a second compartment 661. A part of the communicating opening 61 aligning with the dust container 65 forms a first opening 611, and another part of the communicating opening 61 aligning with the exhaust hood 66 forms a second opening 612. The first opening 611 aligns with the second inlet 121, and the second opening 612 aligns with the second outlet 122. The inner auxiliary inlet 62 and the first opening 611 communicate with the first compartment 651, and the inner auxiliary outlet 63 and the second opening 612 communicate with the second compartment 661.

Accordingly, with the dust container 65 and the exhaust hood 66 arranged inside the base 6, the second embodiment of the air exchange device can guide the airflow into the inner auxiliary inlet 62 by the first compartment 651 of the dust container 65 after the airflow of the first air-guiding space 1a passes through the second inlet 121 of the air-guiding tube 1 and the first opening 611. Therefore, the second filter 32 filters the airflow, and, then, the airflow is guided to the internal space "S2" via the second inlet 121. Similarly, the airflow of the internal space "S2" can pass through the inner auxiliary outlet 63 and then be guided to the second opening 612 by the second compartment 661 of the exhaust hood 66, to be guided to the second air-guiding space 1b via the second outlet 122. In other words, the first compartment 651 and the second compartment 661 can be used to replace the first air-dividing space 6a and the second air-dividing space 6b formed by the board 64 in the first embodiment.

Figure 6:
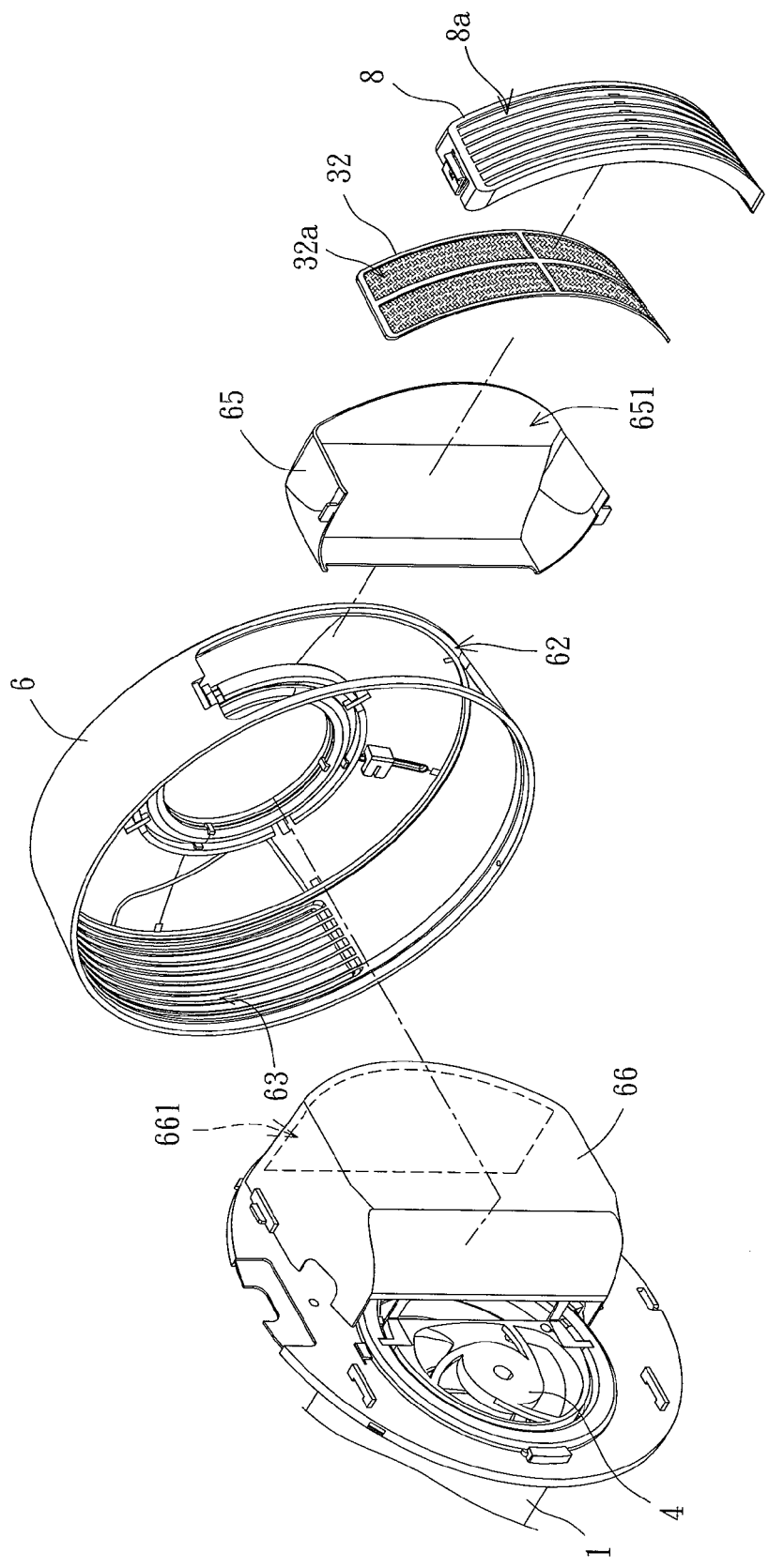
FIG. 6 is an exploded and perspective view of a base of the air exchange device according to the second embodiment of the present invention.

Referring to FIG. 6, the second filter 32 is arranged at the inner auxiliary inlet 62, so that the dust container 65 can collect the particulate matter filtered out by the second filter 32 inside the first compartment 651. Furthermore, since the dust container 65 is detachably coupled inside the base 6 via the inner auxiliary inlet 62, the user can directly remove the dust container 65 via the inner auxiliary inlet 62 when the amount of the particulate matter inside the first compartment 651 is over or when the second filter 32 is blocked. Then, the user may clean or replace the dust container 65 and the second filter 32. As a result, the air exchange device can have better convenience in use.

Additionally, like what is illustrated previously, the second filter 32 can be made of filtering material qualified as the CCME standard for particulate matter 2.5, which makes the cost of the second filter 32 higher. Therefore, the second embodiment of the air exchange device can further include a shield 8 formed between the second filter 32 and the internal space "S2," and the shield 8 can couple with a side of the inner auxiliary inlet 62 of the base 6, with said side of the inner auxiliary inlet 62 facing the internal space "S2," so that unwanted objects inside the internal space "S2" are prevented from touching the second filter 32 via the inner auxiliary inlet 62. As a result, the attrition rate of the second filter 32 can be efficiently decreased. Specifically, the shield 8 also has a plurality of meshes 8a, with the bores of the meshes 8a of the shield 8 being larger than the bores of the meshes 32a of the second filter 32, so that the shield 8 does not block the airflow going to enter the internal space "S2" as well as provides a proper protection to the second filter 32.

Moreover, referring to FIGS. 1 through 4, in the first and second embodiments of the air exchange device, the air-guiding tube 1 has a first direction "X" and a second direction "Y" perpendicular to each other. The first end 11 and the second end 12 are formed at two ends of the first direction "X" of the air-guiding tube 1. The partition 2 extends in the first direction "X" from the first end 11 until the second end 12, to divide the inside of the air-guiding tube 1 in the second direction "Y" to form the first air-guiding space 1a and the second air-guiding space 1b. Specifically, the first partitioning part 2a of the partition 2 is adjacent to the first end 11 of the air-guiding tube 1, the second partitioning part 2b of the partition 2 is adjacent to the second end 12 of the air-guiding tube 1, and the inclined connecting section 2c linking and between the first partitioning part 2a and the second partitioning part 2b extends in the first direction "X" and inclines from the first air-guiding space 1a to the second air-guiding space 1b. As a result, the bore of the first inlet 111 is smaller than the bore of the first outlet 112, and the bore of the second inlet 121 is larger than the bore of the second outlet 122.

With the above described structure, the fan 4 can be arranged in the first air-guiding space 1a, and the fan 4 can be arranged on a surface of the second partitioning part 2b, with said surface facing the first air-guiding space 1a, so that the fan 4 is arranged to face the second inlet 121. The arrangement that the fan 4 faces the second inlet 121 can form a distance between the fan 4 and the first end 11 of the air-guiding tube 1. Thus, too large pressure caused by the operating fan 4 and leading to a large amount of impurity penetrating the first filter 31 is avoided. Furthermore, since the bore of the second inlet 121 is larger than the bore of the second outlet 122, the arrangement that the fan 4 is mounted on said surface of the second partitioning part 2b, which faces the first air-guiding space 1a, makes the fan 4 able to have a larger outer diameter, and thus can obtain a better air-guiding efficiency. On the other hand, said fan 4 can be arranged in the second air-guiding space 1b, and the fan 4 can be arranged on a surface of the first partitioning part 2a, with said surface facing the second air-guiding space 1b, so that the fan 4 is arranged to face the first outlet 112. Since the bore of the first inlet 111 is smaller than the bore of the first outlet 112, the arrangement that the mounted on said surface of the first partitioning part 2a, which faces the second air-guiding space 1b, makes the fan 4 able to have a larger outer diameter, and thus can obtain a better air-guiding efficiency. Accordingly, the at least one fan 4 can be two fans 4, with the two fans 4 arranged in the first air-guiding space 1a and the second air-guiding space 1b respectively. One of the fans 4 is mounted on a surface of the second partitioning part 2b facing the first air-guiding space 1a, and the other one of the fans 4 is mounted on a surface of the first partitioning part 2a facing the second air-guiding space 1b.

With the partition 2 having the inclined connecting section 2c, the first and second embodiments of the disclosed air exchange device can have the bore of the first inlet 111 smaller than the bore of the first outlet 112 as well as the bore of the second inlet 121 larger than the bore of the second outlet 122. Accordingly, the fan 4 can be arranged to face the first outlet 112 or the second inlet 121 and has a larger outer diameter under the situation that the inner diameter of the air-guiding tube 1 is unchanged, to obtain a better air-guiding efficiency.

With the air exchange device of the first or second embodiment of the present disclosure, the divider "D" can be selected to have a single through hole "D1", to coordinate with the air exchange device to provide a desirable air exchange function between the external space "S1" and the internal space "S2." Particularly, since it is unnecessary to form two or more than two through holes in the divider "D," only one air-guiding tube 1 has to be arranged in the single through hole "D1" for providing the desirable air exchange function. Therefore, the embodiments of the air exchange device of the present invention have advantages such as a wide range in application and easy installation, which surely have the efficiency in improvement of practicality of the air exchange device.

Moreover, the first filter 31 is arranged in a position adjacent to the first inlet 111 of the first end 11 of the air-guiding tube 1, the second filter 32 is arranged in a position adjacent to the second inlet 121 of the second end 12 of the air-guiding tube 1, and the bores of the meshes 31a of the first filter 31 are larger than the bores of the meshes 32a of the second filter 32. Therefore, the first filter 31 can proceed a first filtering process to the airflow passing through the air-guiding tube 1, to filter out large impurities in the air in the external space "S1." The second filter 32 can proceed a second filtering process to said airflow, to filter out particulate matter in the air in the external space "S1." Accordingly, in comparison with the conventional air exchange device 9, which only depends on the single filter 921 to filter the airflow passing through the fan 92, the air exchange device of the present invention has the first and second filters 31, 32 to respectively filter the airflow passing through the air-guiding tube 1, so that the air-filtering efficiency is surely improved. Thus, a better air quality of the airflow drawn from the external space "S1" is assured.

Additionally, the first and second filters 31, 32 can couple with a cap 5 and a base 6 respectively, and the cap 5 and base 6 can couple with the air-guiding tube 1 in a detachable way, so that the first and second filters 31, 32 can be easily removed to be cleaned or replaced without disengagement of the at least one fan 4. Thus, usage convenience of the air exchange device is improved. Specifically, there is a dust container 65 inside the base 6 of the second embodiment of the air exchange device, and the dust container 65 can collect the particulate matter filtered out by the second filter 32 and can be removed for the user to clean or replace the dust container 65 and the second filter 32, so that the usage convenience of the air exchange device is further improved.

In sum, the air exchange device of the present disclosure divides the inside of the air-guiding tube 1 into two independently separate spaces by the partition 2, which can provide effects such as desirable air exchange function and improvements in practicality of the air exchange device, air-filtering performance and usage convenience.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An air exchange device comprising:
   an air-guiding tube having a first end and a second end opposite to each other, with the first end having a first inlet and a first outlet, and with the second end having a second inlet and a second outlet;
   a partition arranged inside the air-guiding tube to completely divide the inside of the air-guiding tube into a first air-guiding space and a second air-guiding space, wherein the partition prevents air flow between the first and second air-guiding spaces, with the first air-guiding space communicating with the first inlet and the second inlet, and with the second air-guiding space communicating with the first outlet and the second outlet;
   a first filter filtering air flow through the first inlet of the first air-guiding space of the air-guiding tube;
   a second filter filtering air flow through the second inlet of the first air-guiding space of the air-guiding tube; and
   at least one fan adapted to draw and expel air and combined with the air-guiding tube;
   wherein bores of meshes of the first filter are larger than bores of meshes of the second filter.

2. The air exchange device as claimed in claim 1, wherein an external space is outside the first end of the air-guiding tube, wherein the first filter communicates with the first inlet, and wherein the first filter is formed between the first air-guiding space and the external space for filtering the airflow passing through the first inlet.

3. The air exchange device as claimed in claim 2, further comprising a cap having an annular peripheral wall extending between a closed end and a communicating opening, with the peripheral wall including an outer auxiliary inlet and an outer auxiliary outlet circumferentially spaced from each other, wherein the cap connects with the first end of the air-guiding tube and faces the first inlet and the first outlet via the communicating opening, and wherein the first filter is arranged at the outer auxiliary inlet.

4. The air exchange device as claimed in claim 3, wherein the cap has a board completely separating an inside of the cap into a first air-dividing space and a second air-dividing space, wherein the board prevents air flow between the first and second air-dividing spaces, wherein the communicating opening includes a first opening and a second opening corresponding to the board, wherein the first opening aligns with the first inlet, wherein the second opening aligns with the first outlet, wherein the outer auxiliary inlet and the first opening communicate with the first air-dividing space, and wherein the outer auxiliary outlet and the second opening communicate with the second air-dividing space.

5. The air exchange device as claimed in claim 4, wherein the board is adjacent to the first end, connects with the partition, and extends into the cap to the closed end via the communicating opening.

6. The air exchange device as claimed in claim 2, wherein an internal space is outside the second end of the air-guiding tube, wherein the second filter communicates with the second inlet, and wherein the second filter is formed between the first air-guiding space and the internal space for filtering the airflow passing through the second inlet.

7. The air exchange device as claimed in claim 6, further comprising a shield formed between the second filter and the internal space, wherein bores of meshes of the shield are larger than the bores of the meshes of the second filter.

8. The air exchange device as claimed in claim 6, further comprising a base having an annular peripheral wall extending between a base end and a communicating opening, with the annular peripheral wall of the base including an inner auxiliary inlet and an inner auxiliary outlet spaced circumferentially from each other, wherein the base connects with the second end of the air-guiding tube and faces the second inlet and the second outlet via the communicating opening of the base, and wherein the second filter is arranged at the inner auxiliary inlet.

9. The air exchange device as claimed in claim 8, further comprising a shield formed between the second filter and the internal space, wherein the shield couples with a side of the inner auxiliary inlet of the base, wherein said side of the inner auxiliary inlet faces the internal space, and wherein bores of meshes of the shield are larger than the bores of meshes of the second filter.

10. The air exchange device as claimed in claim 8, wherein the base has a board in alignment with the communicating opening of the base and completely separating an inside of the base into a first air-dividing space and a second air-dividing space, wherein the board prevents air flow between the first and second air-dividing spaces wherein the communicating opening of the base includes a first opening and a second opening correspondingly to the board of the base, wherein the first opening aligns with the second inlet, wherein the second opening aligns with the second outlet, wherein the inner auxiliary inlet and the first opening communicate with the first air-dividing space of the base, and wherein the inner auxiliary outlet and the second opening communicate with the second air-dividing space of the base.

11. The air exchange device as claimed in claim 8, wherein the base has a dust container inside, wherein the dust container is detachably coupled inside the base via the inner auxiliary inlet and has a first compartment, wherein a part of the communicating opening of the base aligning with the dust container forms a first opening, wherein another part of the communicating opening of the base misaligning with the dust container forms a second opening, wherein the first opening of the base aligns with the second inlet, wherein the second opening of the base aligns with the second outlet, and wherein the inner auxiliary inlet and the first opening communicate with the first compartment.

12. The air exchange device as claimed in claim 11, wherein the base has an exhaust hood inside, wherein a part of the communicating opening of the base aligning with the exhaust hood forms the second opening, wherein the exhaust hood has a second compartment, and wherein the inner auxiliary outlet and the second opening communicate with the second compartment.

13. The air exchange device as claimed in claim 1, wherein the air-guiding tube has a first direction and a second direction perpendicular to each other, wherein the first end and the second end are formed at two ends of the first direction of the air-guiding tube, wherein the partition extends in the first direction from the first end until the second end, to divide the inside of the air-guiding tube in the second direction to form the first air-guiding space and the second air-guiding space.

14. The air exchange device as claimed in claim 13, wherein the partition has a first partitioning part and a second partitioning part, wherein the first partitioning part is adjacent to the first end of the air-guiding tube, wherein the second partitioning part is adjacent to the second end of the air-guiding tube, wherein an inclined connecting section links and is between the first partitioning part and the second partitioning part, wherein the inclined connecting section extends in the first direction and inclines from the first air-guiding space to the second air-guiding space, wherein a bore of the first inlet is smaller than a bore of the first outlet, and wherein a bore of the second inlet is larger than a bore of the second outlet.

15. The air exchange device as claimed in claim 14, wherein the at least one fan is arranged inside at least one of the first air-guiding space and the second air-guiding space.

16. The air exchange device as claimed in claim 15, wherein the at least one fan is a single fan, wherein the single fan is arranged in the first air-guiding space, and wherein the single fan is arranged on a surface of the second partitioning part, with said surface facing the first air-guiding space.

17. The air exchange device as claimed in claim 15, wherein the at least one fan is a single fan, wherein the single fan is arranged in the second air-guiding space, and wherein the single fan is arranged on a surface of the first partitioning part, with said surface facing the second air-guiding space.

18. The air exchange device as claimed in claim 14, wherein the at least one fan has two fans, wherein the two fans are arranged in the first air-guiding space and the second air-guiding space respectively, wherein one of the two fans is mounted on a surface of the second partitioning part facing the first air-guiding space, and wherein another one of the two fans is mounted on a surface of the first partitioning part facing the second air-guiding space.

19. The air exchange device as claimed in claim 1, wherein the air-guiding tube connects with a cover covering the first end of the air-guiding tube.

20. The air exchange device as claimed in claim 1, wherein the second filter is made of filtering material qualified as a standard for particulate matter 2.5, high efficiency particulate air filter, or ultra low penetration air filter.

* * * * *